United States Patent
Coban et al.

(10) Patent No.: US 11,457,242 B2
(45) Date of Patent: Sep. 27, 2022

(54) GRADUAL RANDOM ACCESS (GRA) SIGNALLING IN VIDEO CODING

(71) Applicant: QUALCOMM Incorporated, San Diego, CA (US)

(72) Inventors: Muhammed Zeyd Coban, Carlsbad, CA (US); Adarsh Krishnan Ramasubramonian, Irvine, CA (US); Vadim Seregin, San Diego, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/909,447

(22) Filed: Jun. 23, 2020

(65) Prior Publication Data

US 2020/0404334 A1    Dec. 24, 2020

Related U.S. Application Data

(60) Provisional application No. 62/867,083, filed on Jun. 26, 2019, provisional application No. 62/865,838, filed on Jun. 24, 2019.

(51) Int. Cl.
*H04N 19/70* (2014.01)
(52) U.S. Cl.
CPC .................................... *H04N 19/70* (2014.11)
(58) Field of Classification Search
CPC ....... H04N 19/70; H04N 19/172; H04N 19/46
See application file for complete search history.

(56) References Cited

U.S. PATENT DOCUMENTS

| 9,398,293 B2 * | 7/2016 | Wang | H04N 19/31 |
| 2014/0085415 A1 * | 3/2014 | Bici | H04N 19/597 348/43 |
| 2014/0355692 A1 * | 12/2014 | Ramasubramonian | H04N 19/30 375/240.26 |
| 2015/0063453 A1 * | 3/2015 | Kang | H04N 19/124 375/240.12 |

(Continued)

FOREIGN PATENT DOCUMENTS

| CA | 2952348 A1 * | 12/2015 | ........... H04N 19/184 |
| WO | WO-2020185150 A1 * | 9/2020 | ........... H04N 19/172 |
| WO | WO-2021033749 A1 * | 2/2021 | ............. H04N 19/70 |

OTHER PUBLICATIONS

Bross, B., et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, JCTVC-I1003_d9, 280 Pages.

(Continued)

*Primary Examiner* — Richard A Hansell, Jr.
(74) *Attorney, Agent, or Firm* — Shumaker & Sieffert, P.A.

(57) ABSTRACT

A method of decoding video data includes decoding, from a coded video bitstream and as an unsigned integer 0-th order Exp-Golomb-coded syntax element with the left bit first, a value that specifies a target recovery point picture for a current picture of a current sequence of pictures, wherein the target recovery point picture is located at or after the current picture in display order; and recovering decoding of the current sequence of pictures at the target recovery point picture.

12 Claims, 8 Drawing Sheets

(56) References Cited

U.S. PATENT DOCUMENTS

| | | | | |
|---|---|---|---|---|
| 2015/0382018 | A1* | 12/2015 | Hendry | H04N 19/30 375/240.12 |
| 2020/0060752 | A1* | 2/2020 | Germain | A61B 17/1633 |
| 2020/0177923 | A1* | 6/2020 | Chen | H04N 19/107 |
| 2022/0141494 | A1* | 5/2022 | Deshpande | H04N 19/70 375/240.26 |
| 2022/0150546 | A1* | 5/2022 | Sjöberg | H04N 19/188 |

OTHER PUBLICATIONS

Bross B., et al., "Versatile Video Coding (Draft 5)", 126. MPEG Meeting, Mar. 25, 2019-Mar. 29, 2019, Geneva, (Motion Picture Expert Group of ISO/IEC JTC1/SC29/WG11), No. m48053, May 29, 2019 (May 29, 2019), XP030212625, 386 Pages, Retrieved from the Internet: URL:http://phenix.int-evry.fr/mpeg/doc_end_user/documents/126_Geneva/wg11/m48053-JVET-N1001-v7-JVET-N1001-v7.zip JVET-N1991-v7.docx [retrieved on May 29, 2019] p. 89-p. 95.

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16) 'No. JVET-N1001, Jun. 11, 2019 (Jun. 11, 2019), XP030205561, retrieved from the Internet: URL: http://phenix.int-evry.fr/jvet/doc_end_user/documents/14_Geneva/wg11/JVET-N1001-v8.zip JVET-N1001-v8.docx. [retrieved on Jun. 11, 2019] section 7.3.5.1 section 7.4.6.1, cited in the application sections 8.7. 4. 1-8. 7.4.3. 395 pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET- Q2001-vE, 515 Pages.

Coban (Qualcomm) M., et al., "AHG17: On Gradual Random Access (GRA)", 15. JVET Meeting, Jul. 3, 2019-Jul. 12, 2019, Gothenburg, (The Joint Video Exploration Team of ISO/IEC JTC1/SC29/WG11 and ITU-T SG.16), No. JVET-O0201, Jun. 26, 2019 (Jun. 26, 2019), XP030218828, 2 pages, Retrieved from the Internet: URL: http://phenix.int-evry.fr/jvet/doc_end_user/documents/15_Gothenburg/wg11/JVET-O0201-v1.zip JVET-O0201.docx. [retrieved on Jun. 26, 2019] section 2.

Hannuksela, M.M. et al., "Isolated Regions in Video Coding", IEEE Transactions on Multimedia, IEEE Service Center, Piscataway, NJ, US, vol. 6, No. 2, Apr. 1, 2004 (Apr. 1, 2004), pp. 259-267, XP011109137, ISSN: 1520-9210.

International Search Report and Written Opinion—PCT/US2020/039273—ISA/EPO—dated Sep. 21, 2020.

Zhou (II) M., et al., "Side Activity Report on Slice Header Parsing Overhead Reduction", 10. JCT-VC Meeting, Jul. 11, 2012-Jul. 20, 2012, Stockholm, (Joint Collaborative Team on Video Coding of ISO/IEC JTC1/SC29/WG11 and ITU-T SG.16 ), No. JCTVC-J0571, Jul. 20, 2012 (Jul. 20, 2012), XP030235534, 4 pages, Retrieved from the Internet: URL: http://phenix.int-evry.fr/jct/doc_end_user/documents/10_Stockholm/wg11/JCTVC-J0571-v3.zip. JCTVC-I1003_d9_JointText_J0221_J0571_Comb. doc. [retrieved on 2012-87-20] section 7.2 section 7.4.3section 8 sections, and sections D1.7 and D2.7.

Bross B., et al., "Versatile Video Coding (Draft 9)", Joint Video Experts Team (JVET) of ITU-T SG 16 WP 3 and ISO/IEC JTC 1/SC 29/WG 11, 18th Meeting: teleconference Apr. 15-24, 2020, Document: JVET- R2001-vA, 528 Pages.

* cited by examiner

GRADUAL RANDOM ACCESS (GRA) SIGNALLING IN VIDEO CODING

This application claims the benefit of U.S. Provisional Application No. 62/865,838, filed Jun. 24, 2019, and U.S. Provisional Application No. 62/867,083, filed Jun. 26, 2019, each of which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling gradual random access (GRA) recovery points in video coding. An important aspect in video communication is random access. Random access refers to the ability of a decoder to start decoding a stream at a point other than the beginning of the stream and recover an exact or approximate representation of the decoded pictures. A random access point and a recovery point characterize a random access operation. The random access point is any coded picture where decoding can be initiated. All decoded pictures at or subsequent to a recovery point in output order are correct or approximately correct in content. If the random access point is the same as the recovery point, the random access operation is instantaneous; otherwise, it is gradual.

Random access points enable seek, fast forward, and fast backward operations in locally stored video streams. In video on-demand streaming, servers can respond to seek requests by transmitting data starting from the random access point that is closest to the requested destination of the seek operation. Random access points enable tuning in to a broadcast. In addition, a random access point can be coded as a response to a scene cut in the source sequence or as a response to a fast update intra-picture update request.

In some examples, gradual random access (GRA) pictures may be defined as pictures that signal the beginning of gradual random access with a target recovery point picture order count (POC) value where the recovery picture is located. As such, if a decoder starts the decoding process from GRA picture, the decoder will decode, but not output, the pictures up to the recovery point picture, but the decoder may decode and output pictures from recovery picture and later. A video encoder may signal the target recovery point picture using a syntax element (e.g., recovery_poc_cnt) that has a signed value. This means that picture with a smaller POC value than a current GRA picture can be a recovery point. This results in a condition where all the pictures starting from the recovery point and onwards in decoding can be output. Such a condition may present one or more problems. For instance, there could be pictures in output order that need to be skipped (e.g., not output/displayed) since the pictures precede the recovery point picture in decoding order. This may result in gaps in rendered pictures, which may be undesirable.

In accordance with one or more techniques of this disclosure, a video coder (e.g., a video decoder and/or a video encoder) may code an indication of the target recovery point picture using a syntax element (e.g., recovery_poc_cnt) that has an unsigned value. For instance, the video coder may code the syntax element as an unsigned integer 0-th order exponential golomb-coded syntax element with the left bit first. By coding the target recovery point picture using a syntax element that has an unsigned value, the techniques of this disclosure eliminate the undesirable condition in which gaps are introduced in the output of rendered pictures. Additionally, coding the target recovery point picture using a syntax element that has an unsigned value may reduce the amount of data used to signal the target recovery point picture, which may improve coding efficiency.

In one example, a method for decoding video data includes decoding, from a coded video bitstream and as an unsigned integer 0-th order Exp-Golomb-coded element with the left bit first, a value that specifies a target recovery point picture for a current picture of a current sequence of pictures, wherein the target recovery point picture is located at or after the current picture in display order; and recovering decoding of the current sequence of pictures at the target recovery point picture.

In another example, a method for encoding video data includes selecting, for a current picture of a current sequence of pictures and at or after the current picture in display order, a target recovery point picture; and encoding, in a coded video bitstream and as an unsigned integer 0-th order Exp-Golomb-coded syntax element with the left bit first, a value that specifies the target recovery point picture for the current picture of the current sequence of pictures.

In another example, a device includes a memory configured to store at least a portion of a coded video bitstream; and one or more processors implemented in circuitry and configured to: decode, from the coded video bitstream and as an unsigned integer 0-th order Exp-Golomb-coded syntax element with the left bit first, a value that specifies a target recovery point picture for a current picture of a current sequence of pictures, wherein the target recovery point picture is located at or after the current picture in display order; and recover decoding of the current sequence of pictures at the target recovery point picture.

In another example, a device includes a memory configured to store at least a portion of a coded video bitstream; and one or more processors implemented in circuitry and configured to: select, for a current picture of a current sequence of pictures and at or after the current picture in display order, a target recovery point picture; and encode, in the coded video bitstream and as an unsigned integer 0-th order Exp-Golomb-coded syntax element with the left bit first, a value that specifies the target recovery point picture for the current picture of the current sequence of pictures.

The details of one or more examples are set forth in the accompanying drawings and the description below. Other features, objects, and advantages will be apparent from the description, drawings, and claims.

DETAILED DESCRIPTION

Figure 1:
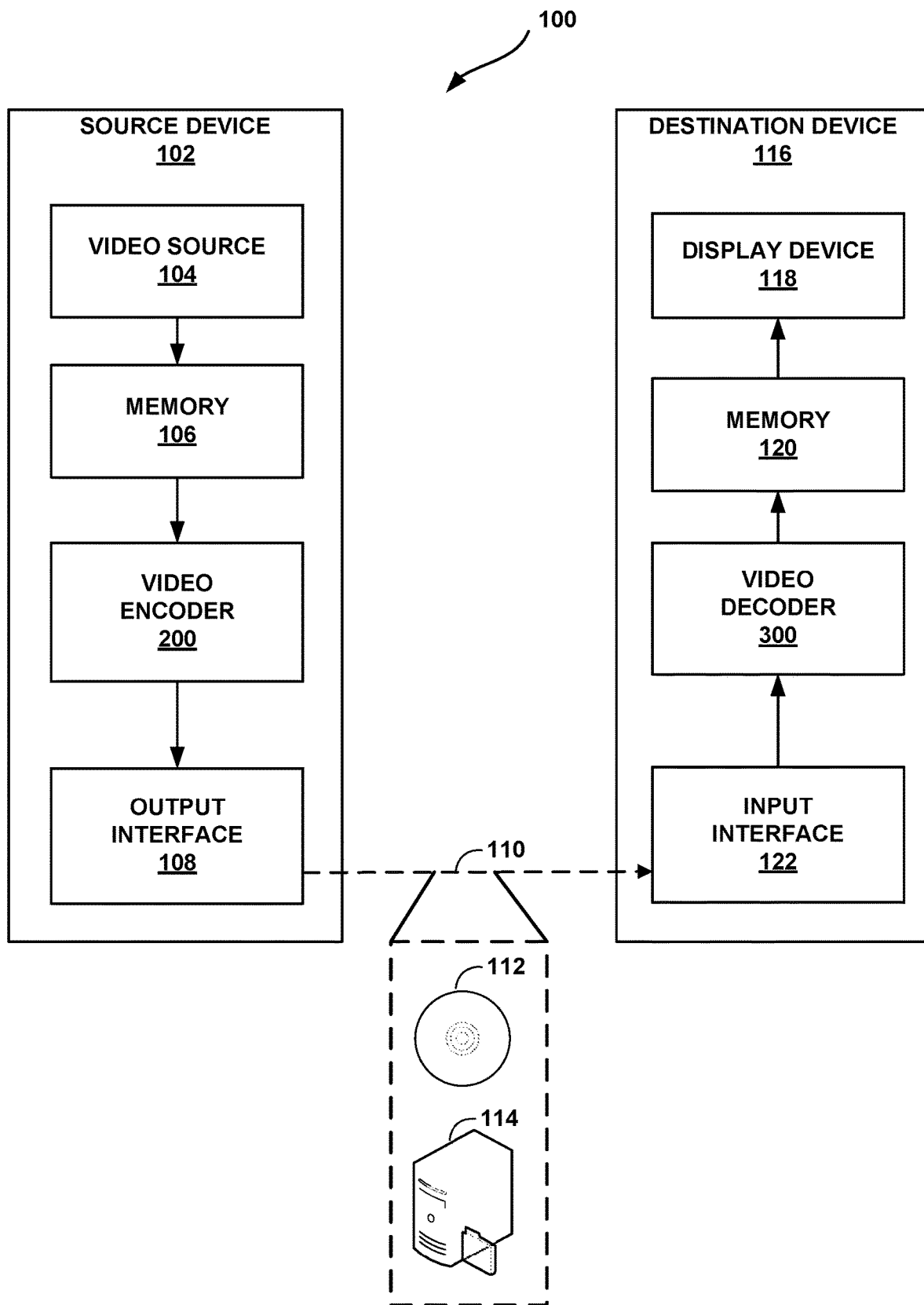
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for gradual random access (GRA) recovery point signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for GRA recovery point signaling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 5)," Joint Video Experts Team (WET) of ITU-T SG 16 WP 3 and ISO/IEC JTC 1/SC 29/WG 11, 14$^{th}$ Meeting: Geneva, CH, 19-27 Mar. 2019, JVET-N1001-v8 (hereinafter "VVC Draft 5"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In VVC Draft 5, gradual random access (GRA) pictures are defined as pictures that signal the beginning of gradual random access with a target recovery point POC value where the recovery picture is located. If a decoder starts the decoding process from GRA picture with NoIncorrectPicOutputFlag set to 1, the decoder may decode, but not output, the pictures up to the recovery point picture will be decoded. The decoder may decode and output pictures from the recovery point picture and later. The target recovery point picture may be signalled by recovery_poc_cnt that has as a signed value and signalled with se(v). This means that picture with a smaller POC value than the current (curr) GRA pic (GRA_NUT) can be a recovery point. As such, all the pictures starting from the recovery point and onwards in decoding can be output.

The current GRA signalling may present one or more problems. As one examples, there could be pictures in output order that need to be skipped (e.g., not output/displayed) since the pictures precede the recovery point picture in decoding order. This would result in gaps in rendered pictures, which is undesirable.

In accordance with one or more techniques of this disclosure, as opposed to allowing allowing recovery point pictures preceding a GRA_NUT picture in display order, a video coder may only allow pictures that are equal or greater than the GRA_NUT picture in POC value for recovery pictures. For instance, as opposed to allowing recovery point pictures having POC values less than a current GRA picture, the video coder may only allow pictures having POC values that are equal to or greater than the current GRA picture to be recovery pictures.

The existing specification and semantics in VVC Draft 5 are provided below:
7.3.5 Slice Header Syntax
7.3.5.1 General Slice Header Syntax

| | Descriptor |
|---|---|
| slice_header( ) { | |
|   slice_pic_parameter_set_id | ue(v) |
|   if( rect_slice_flag \|\| NumBricksInPic > 1 ) | |
|     slice_address | u(v) |

-continued

| | Descriptor |
|---|---|
|   if( !rect_slice_flag && !single_brick_per_slice_flag ) | |
|     num_bricks_in_slice_minus1 | ue(v) |
|   slice_type | ue(v) |
|   if( NalUnitType = = GRA_NUT ) | |
|     recovery_poc_cnt | se(v) |
|   slice_pic_order_cnt_lsb | u(v) |
| ... | | recovery_poc_cnt specifies the recovery point of decoded pictures in output order. If there is a picture picA that follows the current GRA picture in decoding order in the CVS and that has PicOrderCntVal equal to the PicOrderCntVal of the current GRA picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GRA picture in decoding order. The value of recovery_poc_cnt shall be in the range of −MaxPicOrderCntLsb/2 to MaxPicOrderCntLsb/2−1, inclusive.

The variable RpPicOrderCntVal is derived as follows:

$$RpPicOrderCntVal = PicOrderCntVal + recovery\_poc\_cnt \quad (7\text{-}40)$$

8.1 General Decoding Process
8.1.1 General
For each TRAP picture in the bitstream, the following applies:
  If the picture is an IDR picture, the first picture in the bitstream in decoding order, or the first picture that follows an end of sequence NAL unit in decoding order, the variable NoIncorrectPicOutputFlag is set equal to 1.
  Otherwise, if some external means not specified in this Specification is available to set the variable HandleCraAsCvsStartFlag to a value for the picture, HandleCraAsCvsStartFlag is set equal to the value provided by the external means and NoIncorrectPicOutputFlag is set equal to HandleCraAsCvsStartFlag.
  Otherwise, HandleCraAsCvsStartFlag and NoIncorrectPicOutputFlag are both set equal to 0.
For each GRA picture in the bitstream, the following applies:
  If the current picture is the first picture in the bitstream in decoding order or the first picture that follows an end of sequence NAL unit in decoding order, the variable NoIncorrectPicOutputFlag is set equal to 1.
  Otherwise, NoIncorrectPicOutputFlag is set equal to 0.
  NOTE—The above operations, for both TRAP pictures and GRA pictuures, are needed for identification of the CVSs in the bitstream.
8.1.2 Decoding Process for a Coded Picture
The decoding process operates as follows for the current picture CurrPic:
  1. The decoding of NAL units is specified in clause 8.2.
  2. The processes in clause 8.3 specify the following decoding processes using syntax elements in the slice header layer and above:
    Variables and functions relating to picture order count are derived as specified in clause 8.3.1. This needs to be invoked only for the first slice of a picture.
    At the beginning of the decoding process for each slice of a non-IDR picture, the decoding process for reference picture lists construction specified in clause 8.3.2 is invoked for derivation of reference picture list 0 (RefPicList[0]) and reference picture list 1 (RefPicList[1]).

The decoding process for reference picture marking in clause 8.3.3 is invoked, wherein reference pictures may be marked as "unused for reference" or "used for long-term reference". This needs to be invoked only for the first slice of a picture.

When the current picture is a CRA picture with NoIncorrectPicOutputFlag equal to 1 or GRA picture with NoIncorrectPicOutputFlag equal to 1, the decoding process for generating unavailable reference pictures specified in subclause 8.3.4 is invoked, which needs to be invoked only for the first slice of a picture.

PictureOutputFlag is set as follows:

If one of the following conditions is true, PictureOutputFlag is set equal to 0:
  the current picture is a RASL picture and NoIncorrectPicOutputFlag of the associated TRAP picture is equal to 1.
  gra_enabled_flag is equal to 1 and the current picture is GRA picture with NoIncorrectPicOutputFlag equal to 1.
  gra_enabled_flag is equal to 1, the current picture is associated with a GRA picture with NoIncorrectPicOutputFlag equal to 1, and PicOrderCntVal of the current picture is less than RpPicOrderCntVal of the associated GRA picture.
Otherwise, PictureOutputFlag is set equal to 1.

3. [Ed. (YK): Add herein the invocation of the decoding processes for
4. After all slices of the current picture have been decoded, the current decoded picture is marked as "used for short-term reference".

When gra_enabled_flag is equal to 1 and PicOrderCntVal of the current picture is greater than or equal to RpPicOrderCntVal of the previous GRA picture in decoding order for which there is no TRAP picture between the current picture and the previous GRA picture in decoding order, it is a requirement of bitstream conformance that the current and subsequent decoded pictures shall be an exact match to the pictures produced by starting the decoding process at the previous TRAP picture preceding the current picture in decoding order.

As shown above, in VVC Draft 5, a syntax element that specifies the recovery point of decoded pictures in output order (i.e., recovery_poc_cnt) is signaled with se(v), meaning a signed integer 0-th order Exp-Golomb-coded syntax element with the left bit first.

In accordance with one or more techniques of this disclosure, the signaling of the syntax element that specifies the recovery point of decoded pictures in output order (i.e., recovery_poc_cnt) may be performed with ue(v), meaning unsigned integer 0-th order Exp-Golomb-coded syntax element with the left bit first. For example, VVC Draft 5 may be modified as shown below. Additions are shown in italics and deletions are shown with strikethrough.

7.3.5 Slice Header Syntax
7.3.5.1 General Slice Header Syntax

|  | Descriptor |
|---|---|
| slice_header( ) { |  |
|   slice_pic_parameter_set_id | ue(v) |
|   if( rect_slice_flag \|\| NumBricksInPic > 1 ) |  |
|     slice_address | u(v) |

-continued

|  | Descriptor |
|---|---|
|   if( !rect_slice_flag && !single_brick_per_slice_flag ) |  |
|     num_bricks_in_slice_minus1 | ue(v) |
|   slice_type | ue(v) |
|   if( NalUnitType = = GRA_NUT ) |  |
|     recovery_poc_cnt | ~~se(v)~~ *ue(v)* |
|   slice_pic_order_cnt_lsb | u(v) |
| ... |  | recovery_poc_cnt specifies the recovery point of decoded pictures in output order. If there is a picture picA that follows the current GRA picture in decoding order in the CVS and that has PicOrderCntVal equal to the PicOrderCntVal of the current GRA picture plus the value of recovery_poc_cnt, the picture picA is referred to as the recovery point picture. Otherwise, the first picture in output order that has PicOrderCntVal greater than the PicOrderCntVal of the current picture plus the value of recovery_poc_cnt is referred to as the recovery point picture. The recovery point picture shall not precede the current GRA picture in decoding order. The value of recovery_poc_cnt shall be in the range of ~~MaxPicOrderCntLsb/2~~ *0* to MaxPicOrderCntLsb/2−1, inclusive.

The variable RpPicOrderCntVal is derived as follows:

$$RpPicOrderCntVal = PicOrderCntVal + recovery\_poc\_cnt \quad (7\text{-}40)$$

Alternatively, the value of recovery_poc_cnt shall be in the range of 0 to MaxPicOrderCntLsb−1, inclusive.

This disclosure proposes modification of decoder behavior with multiple GRA pictures. For example, if a GRA picture follows a previous GRA picture in decoding order before the recovery point of the prior GRA picture, then the latter GRA picture and hence its recovery picture, overrides the prior GRA pictures recovery point. In other words, the first GRA picture's recovery point picture will no longer be a valid (or associated with the GRA_NUT (GRA picture)) that signalled it as a recovery point picture. The latter GRA picture's recovery point picture will be treated as the recovery point picture. A similar case holds for IRAP pictures that occur in between the GRA picture and its recovery point picture in decoding order. For instance, the output process will not wait for the recovery point picture, instead, the output process can start from IRAP picture.

In some examples, the decoder behavior may be described as follows. An encoder (e.g., video encoder 200) can determine to encode an TRAP picture or start another GRA process after signalling a GRA picture with NoIncorrectPicOutputFlag equal to 1 before its associated recovery point picture in decoding order. In this situation, this disclosure proposes replacing the RpPicOrderCntVal of the decoding process with PicOrderCntVal of the TRAP picture for TRAP case, and with PicOrderCntVal+recovery_poc_cnt, where PicOrderCntVal and recovery_poc_cnt are the PicOrderCntVal and recovery_poc_cnt of the new GRA picture and set NoIncorrectPicOutputFlag equal to 1. For instance, the video decoder (e.g., video decoder 300) may treat a GRA picture with NoIncorrectPicOutputFlag equal to 1's RpPicOrderCntVal as valid until an TRAP or a new GRA_NUT or its associated recovery point picture (or a later POC value) is decoded.

VVC Draft 5 may be modified as follows (with additions shown in italics):
8.1 General Decoding Process
8.1.1 General
. . . .
For each GRA picture in the bitstream, the following applies:
  *If the current picture is the first picture in the bitstream in decoding order or the first picture that follows an end of sequence NAL unit in decoding order, the variable NoIncorrectPicOutputFlag is set equal to 1.*
  *If the current picture is before the RpPicOrderCntVal of previous GRA picture in decoding order with NoIncorrectPicOutputFlag equal to 1, the variable NoIncorrectPicOutputFlag is set equal to 1.*
  Otherwise, NoIncorrectPicOutputFlag is set equal to 0.
    NOTE—The above operations, for both TRAP pictures and GRA pictuures, are needed for identification of the CVSs in the bitstream.

As discussed above, the video decoder may treat the RpPicOrderCntVal of a GRA picture with NoIncorrectPicOutputFlag equal to 1 as valid until an TRAP or a new GRA_NUT or its associated recovery point picture (or a later POC value) is decoded.

As discussed above, the recovery picture may be the picture that is signalled as the picture where everything will be refreshed (recovered) from the point of signalled recover point (recovery_poc_cnt). By signaling a non-negative recovery poc cnt, this disclosure may eliminate the case where a recovery point is signaled before the current decoded picture (i.e., the picture where recovery poc cnt is signalled) in output order, and there are pictures that were decoded before the current picture with output order after the recovery picture. Because these pictures that are after the recovery in output order would not be displayable (not correctly decoded), the decoder may have to skip over them and render the picture that will come after the recovery picture in decoding order after displaying the recovery picture.

The following example illustrates some advantages of the techniques of this disclosure:
Decoding order: PX: X being output order.
. . . P8 P9 P10 (signal P7 as recovery point relative 10 it is negative 3) P7 P11 P12 . . . Output order: (underlined pictures would not be displayed, gap between P7 and P11 (non smooth playback).
. . . P7 P8P9P10 P11 P12 . . . .
By signaling recovery poc_cnt with a non-negative value, the techniques of this disclosure achieve the following:
Decoding order: PX: X being output order.
. . . P8 P9 P10 (signal P14 as recovery point, relative to 10, it is positive 4) P11 P12 P13 P14 . . .
Output order: (underlined pictures would not be displayed, no gap after P14 (smooth playback).
. . . P10P11P12P13 P14 P15 P16 . . . .

In accordance with the techniques of this disclosure, a video coder (e.g., video encoder 200 and/or video decoder 300) may code, via a coded video bitstream and for a current picture, a syntax element specifying a target recovery point picture, wherein the target recovery point picture is located at or after the current picture in display order. As discussed above, by restricting target recovery point picture to be located at or after the current picture in display order, the video coder may avoid gaps in rendered pictures. Additionally, in examples where the syntax element is coded using an unsigned code, this modification may result in a reduction in bitrate as unsigned values typically require fewer bits to code than signed values.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
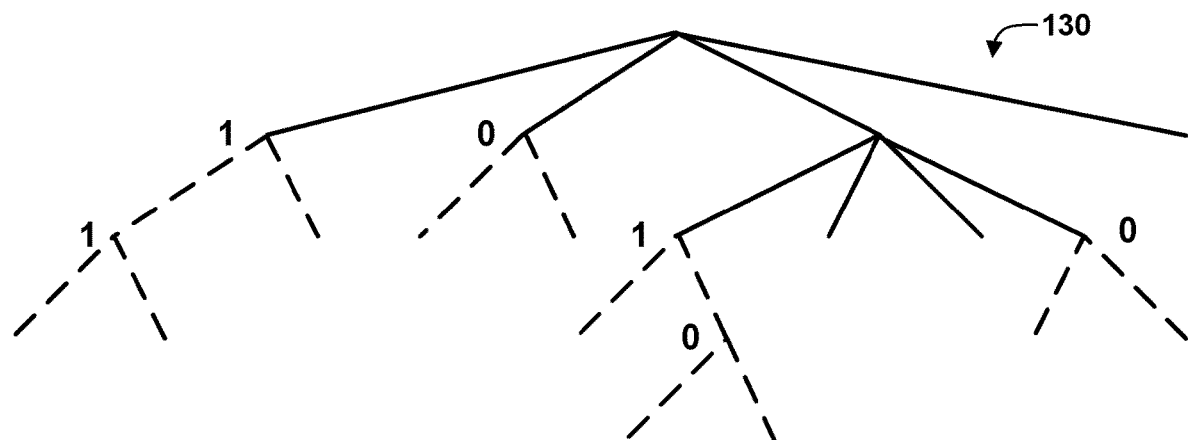
FIGS. 2A and 2B are conceptual diagrams illustrating an example quadtree binary tree (QTBT) structure, and a corresponding coding tree unit (CTU).
Figure 2B:
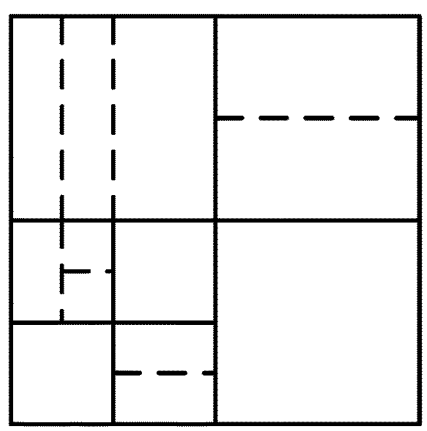

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
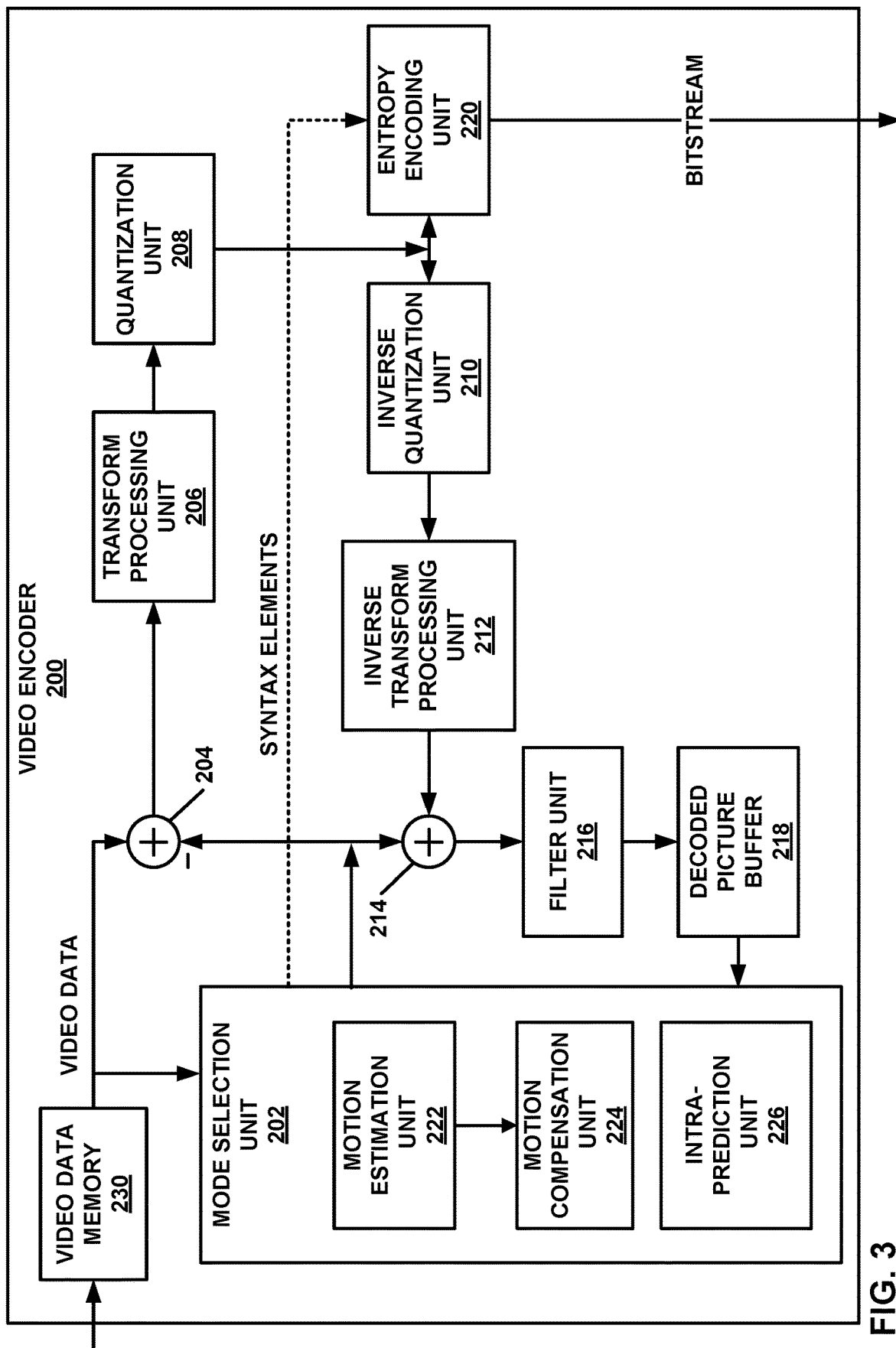
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode, in a coded video bitstream and for a current picture, a syntax element specifying a target recovery point picture, wherein the target recovery point picture is located at or after the current picture in display order.

Figure 4:
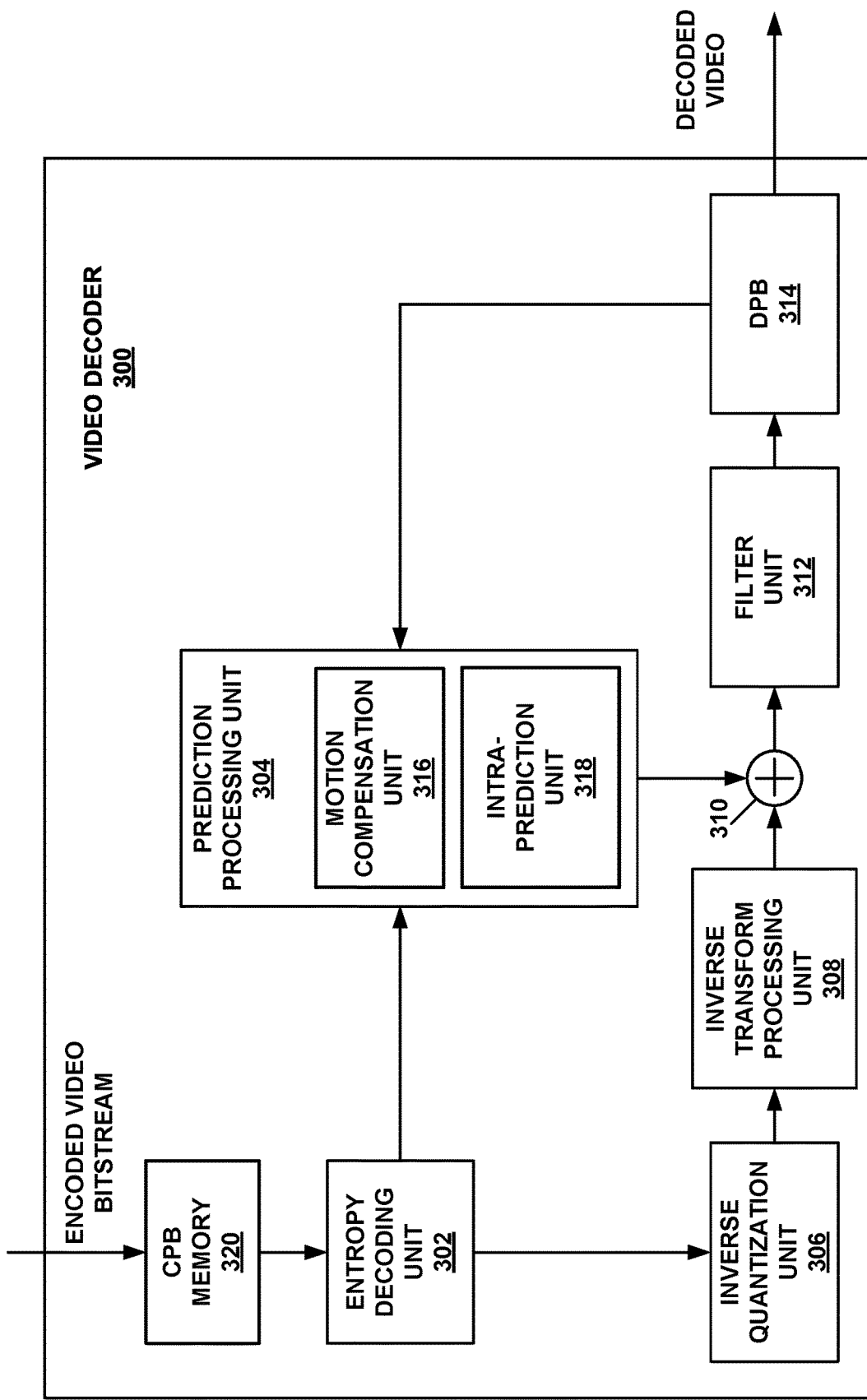
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode, from a coded video bitstream and for a current picture, a syntax element specifying a target recovery point picture, wherein the target recovery point picture is located at or after the current picture in display order. Similarly, video decoder 300 represents an example of a video decoding device including a memory configured to store video data, and one or more processing units implemented in circuitry and configured to decode, from a coded video bitstream, a first gradual random access (GRA) picture having a recovery point; decode, from the coded video bitstream, a second GRA picture having a recovery point; and responsive to determining that the second GRA picture is located between the first GRA picture and the recovery point of the first GRA picture, replacing the recovery point of the first GRA picture with the recovery point of the second GRA picture.

Figure 5:
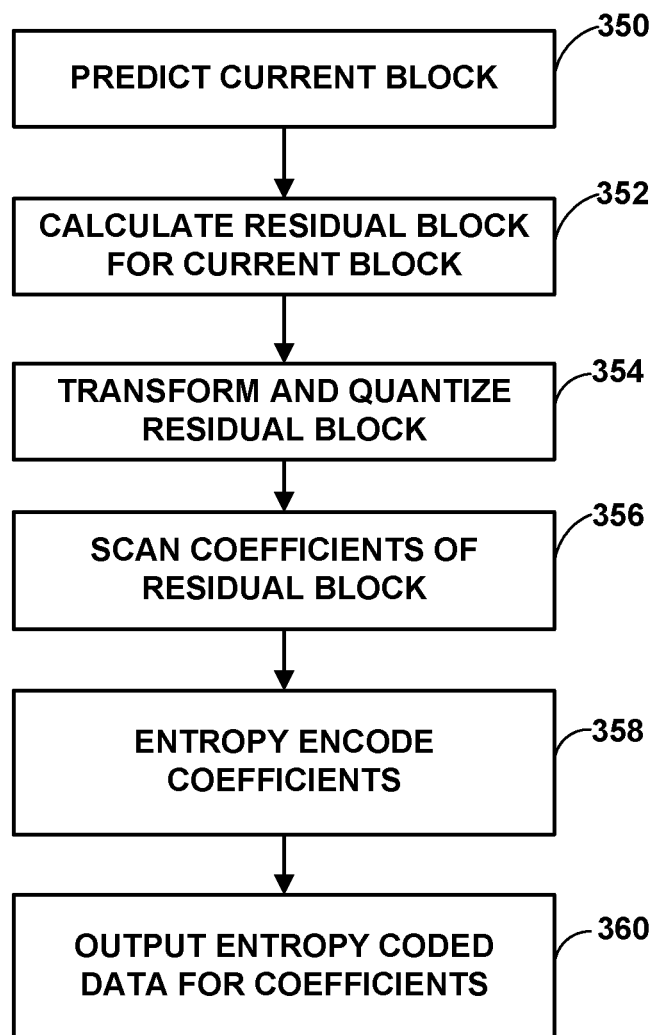
FIG. 5 is a flowchart illustrating an example encoding method of the disclosure.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 6:
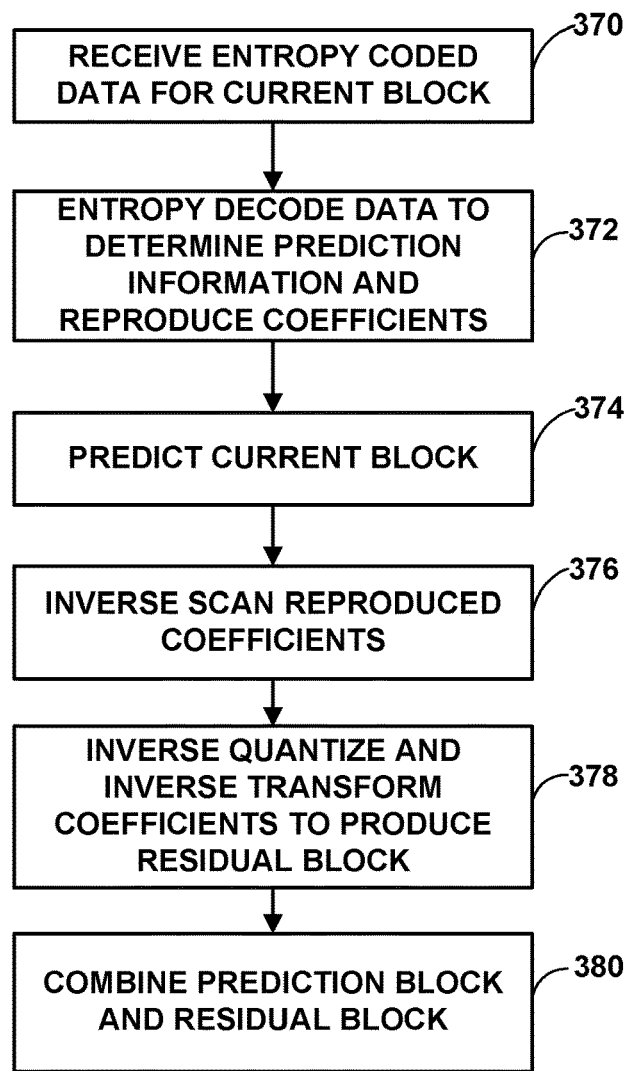
FIG. 6 is a flowchart illustrating an example decoding method of the disclosure.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 7:
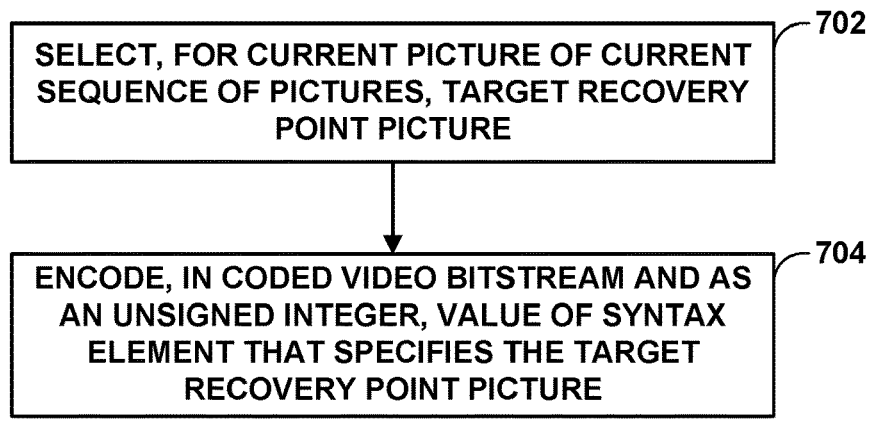
FIG. 7 is a flowchart illustrating an example technique for encoding gradual random access (GRA) recovery points in video coding, in accordance with one or more techniques of this disclosure.

FIG. 7 is a flowchart illustrating an example technique for encoding gradual random access (GRA) recovery points in video coding, in accordance with one or more techniques of this disclosure. Although described with respect to video encoder 200 (FIGS. 1 and 4), it should be understood that other devices may be configured to perform a method similar to that of FIG. 7.

Video encoder 200 may determine to designate a random access point in a current sequence of pictures of video data. For instance, video encoder 200 may determine to designate random access points at regular intervals (e.g., every 30 seconds, 1 minute, etc.) in the sequence of video data. In addition, video encoder 200 may determine to designate a random access point as a response to a scene cut in the source sequence or as a response to a fast update intra-picture update request.

In addition to designating the random access point, video encoder 200 may designate a recovery point. If the random access point is the same as the recovery point, the random access operation is instantaneous; otherwise, it is gradual.

To enable gradual random access (GRA), video encoder 200 may select, for a current picture of the current sequence of pictures and at or after the current picture in display order, a target recovery point picture (702). For instance, mode selection unit 202 of video encoder 200 may identify a picture order count (POC) value of the target recovery point picture. This identified POC value may be referred to as recoveryPointPocVal.

Video encoder 200 may signal an indication of the selected target recovery point picture in a coded video bitstream. As opposed to signaling the identified POC value, video encoder 200 may signal a difference between the identified POC value and a POC value of the current picture (PicOrderCntVal). For instance, video encoder 200 may determine a difference between the identified POC value and the POC value of the current picture in accordance with the following equation where $$recovery\_poc\_cnt = recoveryPointPocVal - PicOrderCntVal$$

where recoveryPointPocVal is the POC value of the target recovery point picture, PicOrderCntVal is the POC value of the current picture, and recovery_poc_cnt is the difference between the POC value of the target recovery point picture and the POC value of the current picture.

Video encoder 200 may select the target recovery point picture such that the value of recovery_poc_cnt meets certain contraints. For instance, video encoder 200 may select the target recovery point picture such that the value of recovery_poc_cnt is in a range of zero to MaxPicOrderCntLsb (e.g., a representation of a maximum picture order count, such as the least signifigant bit of the maximum picture order count), inclusive As discussed above, video encoder 200 may signal a difference between the identified POC value and a POC value of the current picture. As also discussed above, and in accordance with one or more techniques of this disclosure, video encoder 200 may signal the target recovery point picture using a syntax element that has an unsigned value. For instance, mode selection unit 202 may cause entropy encoding unit 220 to encode, in a coded video bitstream and as an unsigned integer 0-th order Exp-Golomb-coded syntax element with the left bit first, a value of a syntax element that specifies the target recovery point picture for the current picture of the current sequence of pictures (704). The syntax element may be titled recovery_poc_cnt or similar.

Entropy encoding unit 220 may encode the syntax element in a header syntax structure of the coded video bitstream that is referred to by the current picture. For instance, entropy encoding unit 220 may encode the syntax element in a slice header or a picture header syntax structure.

By signaling the target recovery point picture using a syntax element that has an unsigned value, video encoder 200 may eliminate the undesirable condition in which gaps are introduced in the output of rendered pictures. Additionally, signaling the target recovery point picture using a syntax element that has an unsigned value may reduce the amount of data used by video encoder 200 to signal the target recovery point picture, which may improve coding efficiency.

Figure 8:
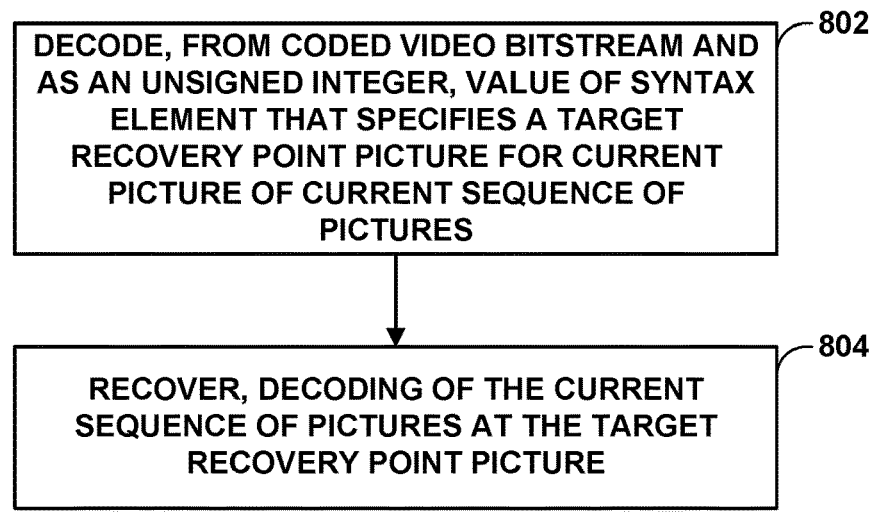
FIG. 8 is a flowchart illustrating an example technique for decoding gradual random access (GRA) recovery points in video coding, in accordance with one or more techniques of this disclosure.

FIG. 8 is a flowchart illustrating an example technique for decoding gradual random access (GRA) recovery points in video coding, in accordance with one or more techniques of this disclosure. Although described with respect to video decoder 300 (FIGS. 1 and 4), it should be understood that other devices may be configured to perform a method similar to that of FIG. 8.

In accordance with one or more techniques of this disclosure and as discussed above, video decoder 300 may signal a target recovery point picture using a syntax element that has an unsigned value. For instance, entropy decoding unit 302 may decode, from a coded video bitstream and as an unsigned integer 0-th order Exp-Golomb-coded syntax element with the left bit first, a value of a syntax element that specifies a target recovery point picture for a current picture of a current sequence of pictures (802). The target recovery point picture may be located at or after the current picture in display order. For instance, the target recovery point picture may have a POC value that is greater than or equal to a POC value of the current picture.

Entropy decoding unit 302 may decode the syntax element from a header syntax structure of the coded video bitstream that is referred to by the current picture. For instance, entropy decoding unit 302 may decode the syntax element from a slice header or a picture header syntax structure.

Video decoder 300 may verify that the value of the sytnax element meets certain contraints. For instance, video decoder 300 may verify that the value of the sytnax element is in a range of zero to MaxPicOrderCntLsb, inclusive.

By signaling the target recovery point picture using a syntax element that has an unsigned value, video decoder 300 may eliminate the undesirable condition in which gaps are introduced in the output of rendered pictures. Additionally, signaling the target recovery point picture using a syntax element that has an unsigned value may reduce the amount of data used by video decoder 300 to signal the target recovery point picture, which may improve coding efficiency.

Video decoder 300 may recover decoding of the current sequence of pictures at the target recovery point picture (804). For instance, responsive to receiving user input indicating a requested destination of a seek operation, video decoder 300 may identify a random access point that is closest to the requested destination of the seek operation and begin or resume decoding of the sequence of pictures at the target recovery point picture.

The following numbered examples may illustrate one or more aspects of the disclosure:

Example 1. A method of coding video data, the method comprising: coding, via a coded video bitstream and for a current picture, a syntax element specifying a target recovery point picture, wherein the target recovery point picture is located at or after the current picture in display order; and coding, based on the syntax element, the current picture.

Example 2. The method of example 1, wherein coding the syntax element comprises coding the syntax element using an unsigned code.

Example 3. The method of example 2, wherein coding the syntax element using the unsigned code comprises coding the syntax element as an unsigned integer 0-th order Exp-Golomb-coded syntax element with the left bit first.

Example 4. The method of any of examples 1-3, wherein the syntax element is a recovery_poc_cnt syntax element.

Example 5. A method of coding video data, the method comprising: obtaining, from a coded video bitstream, information for a first gradual random access (GRA) picture having a recovery point picture; obtaining, from the coded video bitstream, information for a second GRA picture having a recovery point picture; and responsive to determining that the second GRA picture is located between the first GRA picture and the recovery point picture of the first GRA picture, replacing the recovery point picture of the first GRA picture with the recovery point picture of the second GRA picture.

Example 6. The method of example 5, further comprising: determining that the recovery point picture of the first GRA picture is valid until decoding the second GRA picture or the recovery point picture of the second GRA picture.

Example 7. The method of example 5 or example 6, further comprising: determining that the recovery point picture of the first GRA picture is valid until decoding an intra random access point (IRAP) picture.

Example 8. The method of any of examples 5-7, wherein the recovery point picture of the first GRA picture is specified by a first RpPicOrderCntVal variable, wherein the recovery point picture of the second GRA picture is specified by a second RpPicOrderCntVal variable.

Example 9. The method of example 8, wherein replacing the recovery point picture of the first GRA picture with the recovery point picture of the second GRA picture comprises replacing the value of the first RpPicOrderCntVal variable with the value of the a second RpPicOrderCntVal variable.

Example 10. The method of any of examples 1-9, wherein coding comprises decoding.

Example 11. The method of any of examples 1-10, wherein coding comprises encoding.

Example 12. A device for coding video data, the device comprising one or more means for performing the method of any of examples 1-11.

Example 13. The device of example 12, wherein the one or more means comprise one or more processors implemented in circuitry.

Example 14. The device of any of examples 12 and 13, further comprising a memory to store the video data.

Example 15. The device of any of examples 12-14, further comprising a display configured to display decoded video data.

Example 16. The device of any of examples 12-15, wherein the device comprises one or more of a camera, a computer, a mobile device, a broadcast receiver device, or a set-top box.

Example 17. The device of any of examples 12-16, wherein the device comprises a video decoder.

Example 18. The device of any of examples 12-17, wherein the device comprises a video encoder.

Example 19. A computer-readable storage medium having stored thereon instructions that, when executed, cause one or more processors to perform the method of any of examples 1-11.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, from a coded video bitstream and as an unsigned integer 0-th order Exp-Golomb-coded syntax element with the left bit first, a value that specifies a target recovery point picture for a current picture of a current sequence of pictures, wherein the target recovery point picture is located at or after the current picture in display order, wherein the value that specifies the target recovery point picture is in a range of zero to MaxPicOrderCntLsb minus 1, inclusive, and wherein decoding the value comprises decoding the syntax element from a header syntax structure of the coded video bitstream that is referred to by the current picture; and
    recovering decoding of the current sequence of pictures at the target recovery point picture.

2. The method of claim 1, further comprising:
    determining, based on the value that specifies the target recovery point picture and a picture order count (POC) value of the current picture, a POC value of the target recovery point picture.

3. The method of claim 1, wherein the syntax element is a recovery_poc_cnt syntax element.

4. A method of encoding video data, the method comprising:
    selecting, for a current picture of a current sequence of pictures and at or after the current picture in display order, a target recovery point picture; and
    encoding, in a coded video bitstream and as an unsigned integer 0-th order Exp-Golomb-coded syntax element with the left bit first, a value that specifies the target recovery point picture for the current picture of the current sequence of pictures, wherein the value that specifies the target recovery point picture is in a range of zero to MaxPicOrderCntLsb minus 1, inclusive, and wherein encoding the value comprises encoding the syntax element from a header syntax structure of the coded video bitstream that is referred to by the current picture.

5. The method of claim 4, wherein the syntax element is a recovery_poc_cnt syntax element.

6. A device for decoding video data, the device comprising:
    a memory configured to store at least a portion of a coded video bitstream; and
    one or more processors implemented in circuitry and configured to:
        decode, from the coded video bitstream and as an unsigned integer 0-th order Exp-Golomb-coded syntax element with the left bit first, a value that specifies a target recovery point picture for a current picture of a current sequence of pictures, wherein the target recovery point picture is located at or after the current picture in display order, wherein the value that specifies the target recovery point picture is in a range of zero to MaxPicOrderCntLsb minus 1, inclusive, and wherein, to decode the value, the one or more processors are configured to decode the syntax element from a header syntax structure of the coded video bitstream that is referred to by the current picture; and
        recover decoding of the current sequence of pictures at the target recovery point picture.

7. The device of claim 6, further comprising:
 determining, based on the value that specifies the target recovery point picture and a picture order count (POC) value of the current picture, a POC value of the target recovery point picture.

8. The device of claim 6, wherein the syntax element is a recovery_poc_cnt syntax element.

9. The device of claim 6, further comprising a display, the one or more processors further configured to output decoded pictures from the current sequence of pictures for display at the display.

10. A device for encoding video data, the device comprising:
 a memory configured to store at least a portion of a coded video bitstream; and
 one or more processors implemented in circuity and configured to:
  select, for a current picture of a current sequence of pictures and at or after the current picture in display order, a target recovery point picture; and
  encode, in the coded video bitstream and as an unsigned integer 0-th order Exp-Golomb-coded syntax element with the left bit first, a value that specifies the target recovery point picture for the current picture of the current sequence of pictures, wherein the value that specifies the target recovery point picture is in a range of zero to MaxPicOrderCntLsb minus 1, inclusive, and wherein, to encode the value, the one or more processors are configured to encode the syntax element from a header syntax structure of the coded video bitstream that is referred to by the current picture.

11. A non-transitory computer-readable storage medium storing instructions that, when executed by one or more processors of a video decoder, cause the one or more processors to:
 decode, from a coded video bitstream and as an unsigned integer 0-th order Exp-Golomb-coded syntax element with the left bit first, a value that specifies a target recovery point picture for a current picture of a current sequence of pictures, wherein the target recovery point picture is located at or after the current picture in display order, wherein the value that specifies the target recovery point picture is in a range of zero to MaxPicOrderCntLsb minus 1, inclusive, and wherein the instructions that cause the one or more processors to decode the value comprise instructions that cause the one or more processors to decode the syntax element from a header syntax structure of the coded video bitstream that is referred to by the current picture; and
 recover decoding of the current sequence of pictures at the target recovery point picture.

12. The non-transitory computer-readable storage medium of claim 11, further comprising instructions that cause the one or more processors to:
 determine, based on the value that specifies the target recovery point picture and a picture order count (POC) value of the current picture, a POC value of the target recovery point picture.

* * * * *